United States Patent [19]

Jaakkola

[11] 4,213,591
[45] Jul. 22, 1980

[54] JOINT MEANS FOR LIGHT FITTINGS, SUCH AS OFFICE LAMPS

[75] Inventor: Aarno Jaakkola, Porvoo, Finland
[73] Assignee: Oy Lival AB, Nickby, Finland
[21] Appl. No.: 874,091
[22] Filed: Feb. 1, 1978
[30] Foreign Application Priority Data Jul. 12, 1977 [FI] Finland ................................ 772171

[51] Int. Cl.² ........................................... F16M 13/00
[52] U.S. Cl. .................. 248/281.1; 403/55; 403/62; 403/64; 403/70; 403/148
[58] Field of Search ............... 248/123, 280, 281, 585, 248/586, 587; 403/55, 62, 64, 70, 148, 162, 163

[56] References Cited

U.S. PATENT DOCUMENTS

| 1,108,512 | 8/1914 | Miller | 403/163 X |
| 2,195,336 | 3/1940 | Loop | 403/64 |
| 3,188,460 | 6/1955 | Thorsen et al. | 403/148 X |
| 3,214,125 | 10/1965 | Pyuro | 403/163 X |
| 3,419,931 | 1/1969 | Willig | 403/162 X |
| 4,003,536 | 1/1977 | Sekerich | 248/280 |

FOREIGN PATENT DOCUMENTS

| 126302 | 8/1945 | Australia | 248/280 |
| 197918 | 5/1958 | Austria | 248/281 |
| 149767 | 8/1920 | United Kingdom | 403/70 |
| 305873 | 2/1929 | United Kingdom . |
| 351623 | 6/1931 | United Kingdom . |
| 393349 | 6/1933 | United Kingdom . |

Primary Examiner—William H. Schultz
Attorney, Agent, or Firm—Ladas & Parry

[57] ABSTRACT

A joint means for light fittings, such as office lamps, comprising pairs of bars arranged after one another and connected with each other by pairs of joint plates. The plates are pressed against each other and the bars with clamping screws. The bars are connected with the joint plates by means of protuberances on the plates extending into holes in the bars.

9 Claims, 3 Drawing Figures

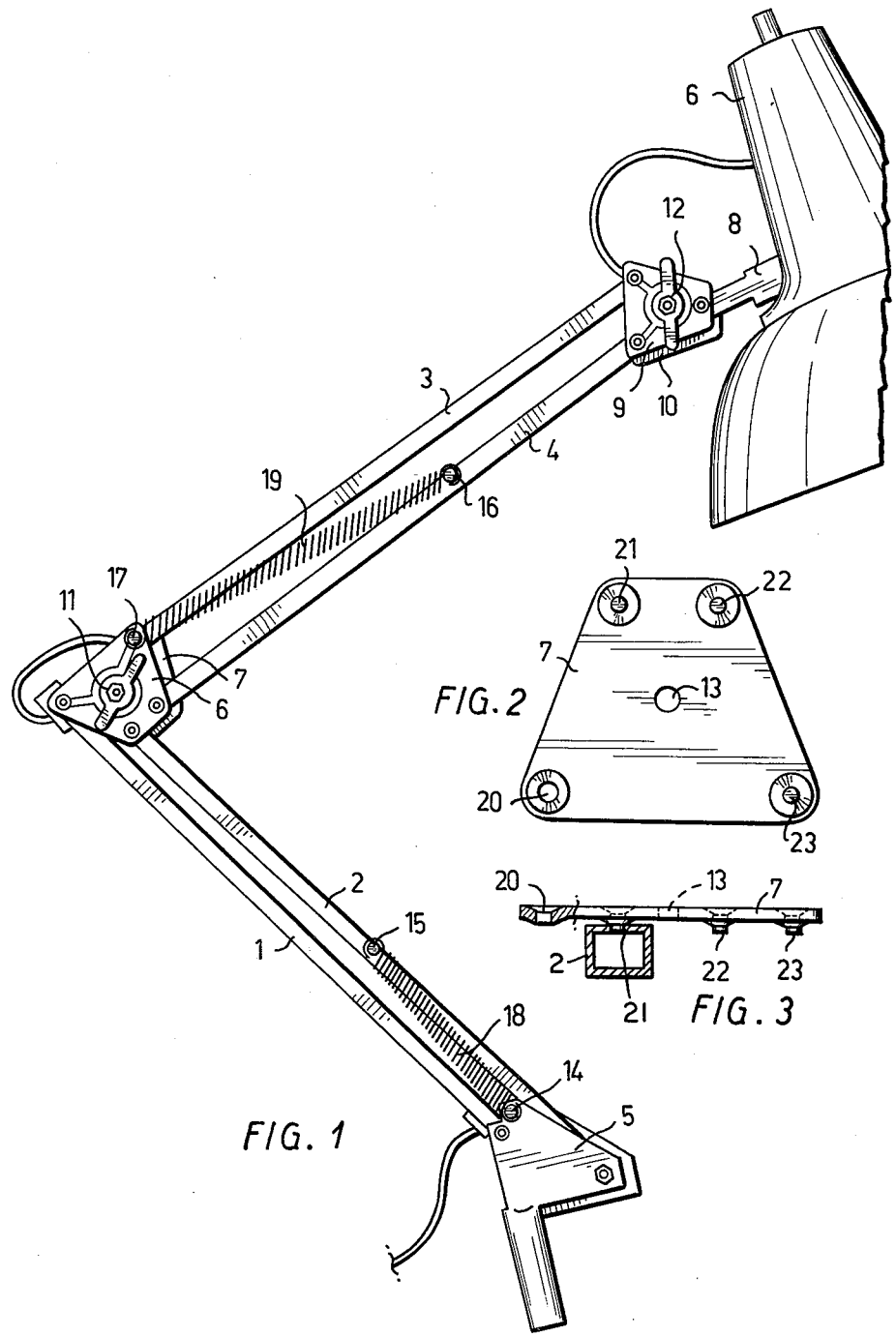

JOINT MEANS FOR LIGHT FITTINGS, SUCH AS OFFICE LAMPS

This invention relates to a joint means for light fittings, such as office lamps, comprising at least one pair of substantially parallel bars, at least one pair of joint plates connecting pairs of bars arranged after one another with each other and/or the free end of one pair of bars with the lamp shade, clamping screws extending through both joint plates in each pair of joint plates to adjust the rigidity of the joint, and fixing members for fixing the joint plates to the ends of the bars, said fixing members extending into holes in the side surfaces of the bars. In previously known office lamps of this kind, which are usually secured to the edge of a table top, the joint plates are fixed to the ends of the bars and to each other by means of screws extending normally from one joint plate to the other through the bar and locked in place with a nut. Due to the use of screws and nuts, the assembly during the manufacturing stage takes a long time per unit produced and requires a big number of screws and nuts.

It is the object of this invention to eliminate these disadvantages and to provide a joint means which during the manufacture can be assembled considerably quicker than the corresponding joint means known hitherto and which, in addition, uses substantially fewer screws and nuts. This object is according to the invention attained in that at least some of the fixing members consist of protuberances on the surface of the joint plates. The assembly is carried out by pushing the protuberances in one joint plate into corresponding holes in the bars, whereafter the clamping screw located preferably in the centre of the joint plate is inserted and tightened. The invention makes use of the fact that the joint plates must anyway be provided with clamping screws which now, however, have a double function, namely to adjust the rigidity of the joint and to keep the plates pressed against the bars.

According to one preferred embodiment of the invention, the protuberances are produced by punching, which greatly simplifies the production of the fixing members.

According to a specially preferred embodiment, the protuberances have the shape of a truncated cone ending in a cylindrical tip. Due to its side surface perpendicular to the plane of the joint plate, the cylindrical tip ensures the locking between the plate and the bar, while the conical surface prevents the protuberances from being fitted loosely in the holes of the bar in the lateral direction and also permits an exact and flexible adjustment of the rigidity of the joint by means of the clamping screw.

One preferred embodiment of the joint means according to the invention will be described in more detail in the following with reference to the accompanying drawing, where FIG. 1 is a side view of an office lamp provided with a joint means according to the invention, FIG. 2 shows the side facing the bars of one joint plate in the lower pair of joint plates, and FIG. 3 is an end view of the joint plate in FIG. 2.

The office lamp according to FIG. 2 comprises mainly two pairs of bars 1 to 4 said pairs of bars being arranged after one another and the bars in both pairs being essentially parallel with each other. The lower end of the lower pair of bars is connected to a pair of plates 5 provided with a pin which is intended to be inserted into a fixing means for securing the lamp, for example, to the top of a table. The upper end of the upper pair of bars supports a lamp shade.

The upper ends of the bars 1, 2 and the lower ends of the bars 3,4 are interconnected by a first pair of joint plates 6 and 7 and the upper ends of the bars 3, 4 are connected to each other and to a pin 8 supporting the lamp shade by a second pair of joint plates 9 and 10. The joint plates in each pair are pushed against the bars in a direction toward each other by means of clamping screws 11 and 12 extending through a hole 13 in the centre of each plate. The pair of plates 5, the central portions of the bars 2 and 4 as well as the lower end of the bar 3 are provided with pins 14 to 17 projecting to both sides and serving as holders for springs 18 and 19. The pins 17 or wires supporting these pins extend through an opening 20 in the joint plates 6 and 7.

According to the invention, the joint plates are provided with protuberances 21 to 23 on the surface facing the bars, said protuberances being intended to project into openings in the ends of the bars. The protuberances are preferably produced by punching the plates. As appears from FIGS. 2 and 3, the protuberances have the shape of a truncated cone ending in a cylindrical tip. They can, however, be cylindrical along their entire length. The bars are normally hollow square tubes, and the protuberances appropriately have a height which is approximately the same as the thickness of the bar material.

The joint plates 9, 10 in the upper end of the upper pair of bars are in a corresponding manner provided with three protuberances projecting into openings in the bars 3, 4 and the pin 8.

The drawing and the accompanying specification are only intended to illustrate the idea of the invention. Thus, the protruberances may be of a different cross-sectional shape than the one shown and may also vary in length. The holes in the bars must, however, have essentially the same diameter as the protuberances. The protuberances can, of course, be produced in some other way than by punching and their number per joint plate may vary.

What I claim is:

1. A support device for a light fitting, comprising a pair of first and second bars disposed side-by-side and substantially parallel to each other with an end of the first bar adjacent an end of the second bar, a pair of third and fourth bars disposed side-by-side and substantially parallel to each other with an end of the third bar adjacent an end of the fourth bar, and joint means connecting said ends of the first and second bars to said ends of the third and fourth bars and comprising a pair of joint plates which are disposed substantially parallel to each other with said ends of the bars therebetween, fixing members extending from each joint plate and entering respective holes in the side surfaces of the bars, and clamping means extending through the joint plates to adjust the rigidity of the connection established by the joint means, at least one of said fixing members consisting of a protuberance on the surface of a joint plate.

2. A support device as claimed in claim 1, wherein the protuberance is cylindrical in shape.

3. A support device as claimed in claim 1, wherein the protuberance has the shape of a truncated cone ending in a cylindrical tip.

4. A support device for a light fitting, comprising at least one pair of first and second bars disposed side-by-side and substantially parallel to each other with an end of the first bar adjacent an end of the second bar, an additional support member having an end portion, and joint means connecting said ends of the first and second bars to said additional support member and comprising a pair of joint plates which are disposed substantially parallel to each other with said ends of the bars and said end portion of the additional support member therebetween, fixing members extending from each joint plate and entering respective holes in the side surfaces of the bars, and clamping means extending through the joint plates to adjust the rigidity of the connection established by the joint means, at least one of said fixing members consisting of a protuberance on the surface of a joint plate, said protuberance having the shape of a truncated cone ending in a cylindrical tip.

5. A support device as claimed in claim 1, wherein said additional support member comprises a pin, and wherein a lamp shade is secured to the pin and supported thereby.

6. A support device as claimed in claim 4, wherein said additional support member comprises a third bar and the support device further comprises a fourth bar, the third and fourth bars being disposed side-by-side and substantially parallel to each other with an end of the third bar adjacent an end of the fourth bar, said joint means connecting said ends of the first and second bars to said ends of the third and fourth bars, said ends of the third and fourth bars being disposed between the joint plates and there being fixing members extending from each joint plate and entering respective holes in the side surfaces of the third and fourth bars.

7. A support device as claimed in claim 1 or 4, wherein the protuberance is produced by punching.

8. A support device as claimed in claim 1 or 4, wherein each of said bars comprises a tube of substantially square cross-section, and the height of the protuberance above the joint plate corresponds essentially to the wall thickness of the tube.

9. A support device as claimed in claim 1, or 4, wherein said clamping means are situated substantially at the center of said joint plates.

* * * * *